United States Patent
Huang et al.

(10) Patent No.: US 11,753,319 B2
(45) Date of Patent: Sep. 12, 2023

(54) METHOD FOR INTENSIFICATION OF ADVANCED BIOLOGICAL NITROGEN REMOVAL AND REDUCTION OF ENDOCRINE DISRUPTING TOXICITY

(71) Applicant: NANJING UNIVERSITY, Nanjing (CN)

(72) Inventors: Hui Huang, Nanjing (CN); Lili Jin, Nanjing (CN); Jun Hu, Nanjing (CN); Hongqiang Ren, Nanjing (CN)

(73) Assignee: NANJING UNIVERSITY, Nanjing (CN)

( * ) Notice: Subject to any disclaimer, the term of this patent is extended or adjusted under 35 U.S.C. 154(b) by 0 days.

(21) Appl. No.: 18/115,014

(22) Filed: Feb. 28, 2023

(65) Prior Publication Data

US 2023/0202887 A1    Jun. 29, 2023

(51) Int. Cl.
| | |
|---|---|
| *C02F 1/72* | (2023.01) |
| *B01J 20/04* | (2006.01) |
| *B01J 20/26* | (2006.01) |
| *B01J 20/32* | (2006.01) |
| *C02F 1/28* | (2023.01) |
| *C02F 1/463* | (2023.01) |
| *C02F 3/28* | (2023.01) |
| *C02F 9/00* | (2023.01) |
| *C02F 1/00* | (2023.01) |
| *C02F 101/30* | (2006.01) |

(52) U.S. Cl.
CPC ............... *C02F 1/722* (2013.01); *B01J 20/04* (2013.01); *B01J 20/267* (2013.01); *B01J 20/32* (2013.01); *C02F 1/288* (2013.01); *C02F 1/463* (2013.01); *C02F 3/28* (2013.01); *C02F 9/00* (2013.01); *C02F 1/00* (2013.01); *C02F 2101/305* (2013.01); *C02F 2305/02* (2013.01)

(58) Field of Classification Search
None
See application file for complete search history.

(56) References Cited

PUBLICATIONS

Ali et al. Separation and Purification Technology, 2020, 241, 116729. (Year: 2020).*
Tachachartvanich et al. Environmental Science and Technology, 2018, 52, 1542-1550. (Year: 2018).*

(Continued)

*Primary Examiner* — Clare M Perrin
(74) *Attorney, Agent, or Firm* — CBM PATENT CONSULTING, LLC

(57) ABSTRACT

A method for intensification of advanced biological nitrogen removal and reduction of endocrine disrupting toxicity, and belongs to the technical field of advanced wastewater treatment includes the steps of utilizing the reaction of calcium sulfate and hydrogen peroxide solution under alkaline conditions to prepare nano-calcium peroxide (n-CP) oxygen-releasing materials, then the polyvinyl alcohol is used as a framework material, the sodium carboxymethyl cellulose is used as a bonding agent, the stearic acid is used as buffering agent and stabilizing agent, the prepared n-CP is used as an oxygen-releasing material, and the quartz sand is used to increase the material density to the sustained-release calcium peroxide nanoparticles (SR-nCPs) through the encapsulation method.

8 Claims, 4 Drawing Sheets

(56) References Cited

PUBLICATIONS

Xiong Zikang et al., "Research progress on external carbon sources for removing nitrogen in the wastewater through denitrification process" Civil Architecture and Environmental Engineering, Issue 002 Dec. 31, 2021.

Lan Mei et al., Selection and preparation of slow-release carbon source materials: Industrial Water Treatment, Issue 02 Feb. 20, 2017.

Huang Jing et al., "Preparation of slow-release oxygen agent and application thereof in black and odorous water treatment" Modern Chemical Industry, Issue 12 Oct. 31, 2018.

Meesam Ali, et al., "Synthesis of controlled release calcium peroxide nanoparticles (CR-nCPs): Characterizations, H2O2 liberate performances and pollutant degradation efficiency" Separation and Purification Technology, vol. 241 Feb. 17, 2020.

Jun Hu, et al., "A Novel In-situ Enhancement Strategy of Denitrification Biofilter for Simultaneous Removal of Steroid Estrogens and Total Nitrogen from Low C/N Wastewater" Chemical Engineering Journal, vol. 452 Aug. 30, 2022.

Yang Jie et al., "Preparation and properties of oxygen-releasing compounds" Journal of Safety and Environment, Issue 02 of vol. 14 Apr. 25, 2014.

Xu Yujin et al., "Preparation and application of novel LDHs-based slow-release carbon source" Environmental Chemistry Aug. 12, 2022.

\* cited by examiner

METHOD FOR INTENSIFICATION OF ADVANCED BIOLOGICAL NITROGEN REMOVAL AND REDUCTION OF ENDOCRINE DISRUPTING TOXICITY

CROSS-REFERENCE TO RELATED APPLICATIONS

This application claims priority to Chinese Patent Application Ser. No. CN202210194760.5 filed on 1 Mar. 2022.

TECHNICAL FIELD

The present invention belongs to the technical field of advanced wastewater treatment, and particularly relates to a method for intensification of advanced biological nitrogen removal and reduction of endocrine disrupting toxicity (estrogen toxicity).

BACKGROUND ART

Conventional wastewater treatment plants are unable to reduce the endocrine disrupting toxicity in a specific and efficient manner, so the secondary effluent still has the endocrine disrupting toxicity, which has thus gradually become a category of toxicity that should be reduced as a priority in the process of wastewater treatment and safe reuse of reclaimed water across China. In addition, Chinese standards of wastewater nitrogen discharge have been increasingly stringent in recent years. A secondary biochemical process for nitrogen removal adopted by conventional wastewater treatment plants can no longer meet the increasingly stringent discharge requirements, and it is often necessary to introduce a tertiary treatment process for advanced nitrogen removal. The advanced nitrogen removal technology of biological denitrification is widely used because of its strong nitrogen removal capability, and the low carbon and nitrogen ratio in the secondary effluent is the key factor affecting the nitrogen removal capability. Moreover, an anoxic environment in the biological denitrification process results in a poor effect on the reduction of endocrine disrupting toxicity. Therefore, it is of great significance to reducing the endocrine disrupting toxicity and making advanced removal of the total nitrogen in the secondary effluent through the process of intensifying advanced biological nitrogen removal.

To solve the existing problem of low carbon and nitrogen content of the secondary effluent, the industry mainly adds carbon sources directly at the water inlet or adds carbon-releasing materials in a reactor, since adding carbon sources directly at the water inlet needs continuous addition, which increases the operating cost, therefore, researches on stable carbon-releasing materials has become a hotspot in the industry. In addition, as substances causing endocrine disrupting toxicity in wastewater are mostly the degradation of aerobic organisms, but the biological denitrification process needs an anoxic environment, therefore, adding an appropriate amount of oxygen-releasing agent to a reactor to create a micro-oxygen environment is a feasible method needed by microorganisms for reducing the endocrine disrupting toxicity and making advanced removal of the total nitrogen. In recent years, there were a growing number of reports about researches on the application of calcium peroxide ($CaO_2$) as an oxygen-releasing material in wastewater treatment, however, direct addition would cause too rapid release of oxygen, considerable increase of the content of free radicals, sharp rising of pH value and other problems. Therefore, it is of great significance to carrying out the research on slow-release calcium peroxide materials.

SUMMARY

Aiming at the above problems, the present invention provides a method for intensification of advanced biological nitrogen removal and reduction of endocrine disrupting toxicity, adopts. The encapsulation method is used to synthesize sustained-release calcium peroxide nanoparticle (SR-nCP) materials, which are applied in a bioreactor. The oxygen and carbon releasing property of the materials can strengthen the reduction of endocrine disrupting toxicity and advanced removal of the total nitrogen in the secondary effluent, and have a broader prospect of market application.

The technical solution of the present invention is as follows: a method for intensification of advanced biological nitrogen removal and reduction of endocrine disrupting toxicity, including the following steps:

S1: Preparing SR-nCPs

S1-1: weighing calcium sulfate powder and adding to deionized water and dispersing evenly, then adding 1 M of a potassium hydroxide solution to the deionized water to prepare an alkaline suspension containing the calcium sulfate powder, where a mass ratio of the calcium sulfate to the deionized water is 1:5-15, a volume ratio of the potassium hydroxide solution to the deionized water is 1:1-5, and reaction equations of the above process are follows:

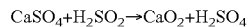

S1-2: using a mechanical stirrer to stir the above alkaline suspension violently at room temperature, slowly adding a hydrogen peroxide solution with a mass fraction of 30% to the alkaline suspension, leaving the suspension stand to react for 2 h and generate a precipitate, where a molar ratio of the hydrogen peroxide to the calcium sulfate in the suspension is 1:5-10;

S1-3: first washing the above precipitate with deionized water for three times, then washing with absolute ethanol for three times, drying under the condition of 60-80° C. for 24-48 h to obtain nano-calcium peroxide (n-CP) oxygen-releasing materials and storing the materials in a sealed and dry environment for subsequent use;

S1-4: weighing polyvinyl alcohol, sodium carboxymethyl cellulose and stearic acid and adding them to deionized water, heating under the condition of 90-100° C. for 2-3 h to obtain a colloidal substance, then weighing the above n-CP oxygen-releasing materials and quartz sand, adding them to the colloidal substance, and mixing and stirring them evenly to obtain a mixed colloidal substance;

S1-5: adding the above mixed colloidal substance to a spherical silicone mold, putting the cooled mold under the condition of −80−−20° C. for freezing crosslinking for 12-16 h, then thawing and freezing again, repeating the process for many times, having frozen crosslinked spherical particles impregnated in a prepared $CaCl_2$ saturated boric acid solution with a mass fraction of 3-6% for chemically crosslinking for 12-16 h, and drying under the condition of 60-80° C. for 24-48 h to obtain SR-nCPs;

S2: adding the SR-nCPs in a targeted manner according to the water quality characteristics of the wastewater, and constructing a SR-nCP layer in a bioreactor; and S3: adopting an inoculation biofilm culturing method or a natural biofilm culturing method to start biofilm culturing, and then introducing wastewater into the bioreactor to perform stable operation.

Further, after the polyvinyl alcohol, sodium carboxymethyl cellulose and stearic acid are added to the deionized water, a mass concentration of the polyvinyl alcohol is 4-10 wt %, a mass concentration of the sodium carboxymethyl cellulose is 1-4 wt %, and a mass concentration of the stearic acid is 1-2 wt %; after the n-CP oxygen-releasing materials and quartz sand are added to the colloidal substance, a mass concentration of the n-CP in the colloidal substance is 5-15 wt %, and a mass ratio of the added quartz sand to the n-CP is 1:1-2, where the polyvinyl alcohol is used as a framework material, the sodium carboxymethyl cellulose is used as a bonding agent, the stearic acid is used as buffering agent and stabilizing agent, the prepared n-CP is used as an oxygen-releasing material, and the quartz sand is used to increase the material density, so that the prepared SR-nCPs have high mechanical strength and are not easy to break, and the effect of slowly releasing oxygen and organic carbon can be better realized.

Further, in the S2, the bioreactor is an anoxic bioreactor or an anaerobic bioreactor, including but not limited to a denitrification biofilter, which provides an anoxic environment for a biological denitrification process, thereby improving the effect of nitrogen removal.

Further, in the S2, the bioreactor runs in a downflow mode, the operating temperature is 10-35° C., the total nitrogen (TN) in the influent is not higher than 30 mg/L, and the endocrine disrupting toxicity of the filler layer is not higher than 20 ng-E2/L, so that the activity of internal microorganisms can be increased and the wastewater denitrification effect can be improved by strictly controlling the reaction conditions of the bioreactor.

Further, in the S2, the quantity of SR-nCPs added and the operating conditions of the reactor are subjected to the following solutions:

S2-1: when the C/N in the influent is lower than 2 (inclusive), the endocrine disrupting toxicity of the effluent is lower than 1.0 ng-E2/L and the TN in the effluent is lower than 15 mg/L, Solution I is selected, namely, the SR-nCP materials added/bioreactor volume equals to 2.5-3 wt %, and the HRT of the reactor is set to be 2-4 h;

S2-2: when the C/N in the influent is lower than 2 (inclusive), the endocrine disrupting toxicity of the effluent is lower than 1.0 ng-E2/L and the TN in the effluent is lower than 10 mg/L, Solution II is selected, namely, the SR-nCP materials added/bioreactor volume equals to 2.5-3 wt %, and the HRT of the reactor is set to be 4-6 h;

S2-3: when the C/N in the influent is lower than 2 (inclusive), the endocrine disrupting toxicity of the effluent is lower than 0.4 ng-E2/L and the TN in the effluent is lower than 5 mg/L, Solution III is selected, namely, the SR-nCP materials added/bioreactor volume equals to 2.5-3 wt %, and the HRT of the reactor is set to be 6-8 h;

S2-4: when the C/N in the influent is greater than 2 but lower than 5, the endocrine disrupting toxicity of the effluent is lower than 1.0 ng-E2/L and the TN in the effluent is lower than 15 mg/L, Solution IV is selected, namely, the SR-nCP materials added/bioreactor volume equals to 1.5-2 wt %, and the HRT of the reactor is set to be 2-4 h;

S2-5: when the C/N in the influent is greater than 2 but lower than 5, the endocrine disrupting toxicity of the effluent is lower than 1.0 ng-E2/L and the TN in the effluent is lower than 10 mg/L, Solution V is selected, namely, the SR-nCP materials added/bioreactor volume equals to 1.5-2 wt %, and the HRT of the reactor is set to be 4-6 h; and S2-6: when the C/N in the influent is greater than 2 but lower than 5, the endocrine disrupting toxicity of the effluent is lower than 0.4 ng-E2/L and the TN in the effluent is lower than 5 mg/L (inclusive), Solution VI is selected, namely, the SR-nCP materials added/bioreactor volume equals to 1.5-2 wt %, and the HRT of the reactor is set to be 6-8 h.

Positions where the SR-nCPs are added in the reactor in the S2 are as follows: at the positions of ⅕-⅓ of the height of the whole filler layer, and the height of the filler layer is limited, so that the water body completely contacts with the SR-nCPs of the filler layer to improve the treatment effect.

Further, the time for adding the SR-nCPs in the S2 is as follows: adding once every 10-20 d according to the effluent quality characteristics of the bioreactor.

Further, fillers of the bioreactor include one or some of ceramsite, quartz sand and volcanic rock.

Further, after the wastewater is treated in the bioreactor in the S3, the wastewater may be further treated by the electrocoagulation precipitation, with the specific process being as follows: adding effluent from the bioreactor to an electrocoagulation precipitation device, electrifying for 5 min under the condition of a DC electric field with a voltage of 3V, and then boosting the voltage at a boost rate of 1V/min until the voltage reaches 6-8 V, so that metabolites of biological treatment are aggregated and precipitated to achieve final discharge or reuse of effluent with better quality.

Compared with the prior art, the present invention has the beneficial effects:

(1) The present invention includes the steps of utilizing the reaction of calcium sulfate and hydrogen peroxide solution under alkaline conditions to prepare n-CP oxygen-releasing materials, then the polyvinyl alcohol is used as a framework material, the sodium carboxymethyl cellulose is used as a bonding agent, the stearic acid is used as buffering agent and stabilizing agent, the prepared n-CP is used as an oxygen-releasing material, and the quartz sand is used to increase the material density to the SR-nCPs by using the encapsulation method. The SR-nCPs are added in the bioreactor in a targeted manner according to the water quality characteristics and the effluent requirements, a SR-nCP layer is constructed in the bioreactor, the reactor is then started to use the slow-release oxygen to promote aerobic microorganisms to reduce the endocrine disrupting toxicity in the wastewater, and the released organic carbon strengthens advanced removal of the total nitrogen in the wastewater. The method adopts a cutting-edge technology and has broader application prospects in the advanced treatment of secondary effluent.

(2) The method for preparing SR-nCPs disclosed in the present invention features readily available in raw materials, easy to operation and mild reaction conditions, and a spherical mold is used to prepare particles, so that the particle size may be adjusted according to actual needs, the prepared SR-nCPs can simultaneously achieve the effect of releasing oxygen and organic carbon in water, and has little impact on the pH of water.

DETAILED DESCRIPTION OF THE EMBODIMENTS

Figure 1:
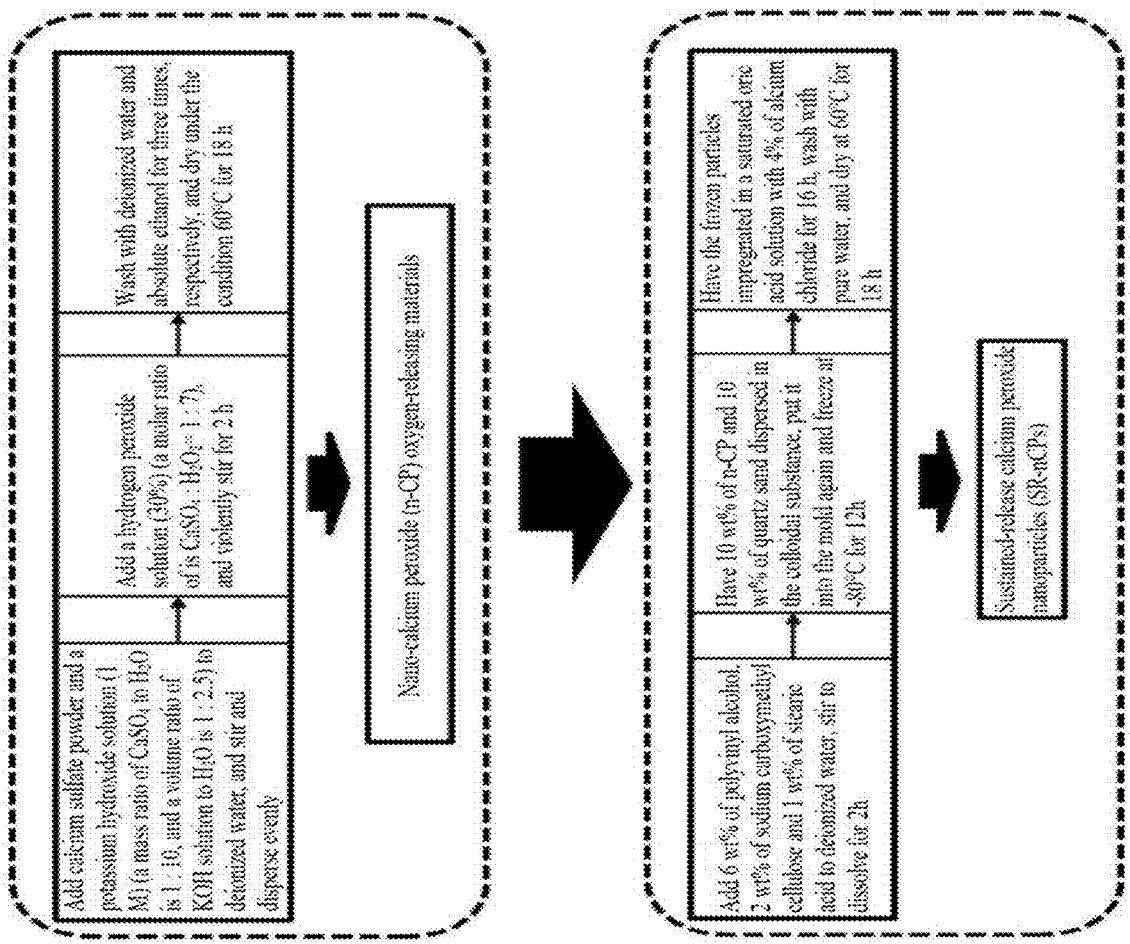
FIG. 1 is a flow chart of preparation of SR-nCPs of the present invention.
Figure 2:
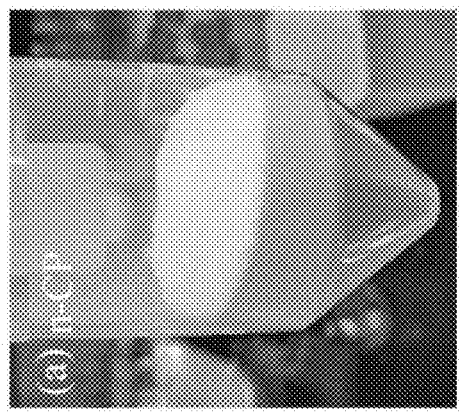
FIG. 2 is a real picture of nano-calcium peroxide of the present invention.
Figure 3:
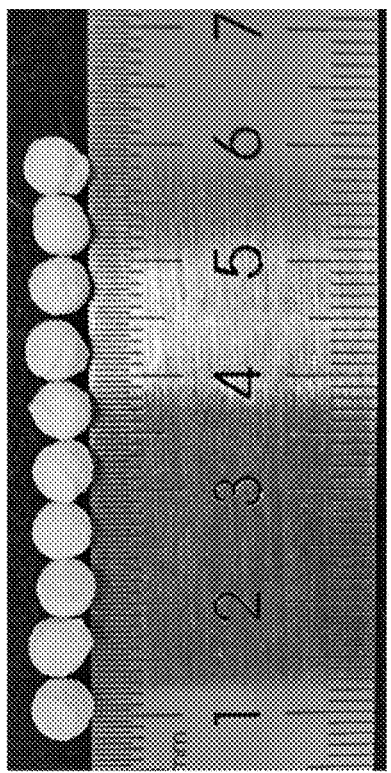
FIG. 3 is a real picture of SR-nCPs of the present invention.
Figure 4:
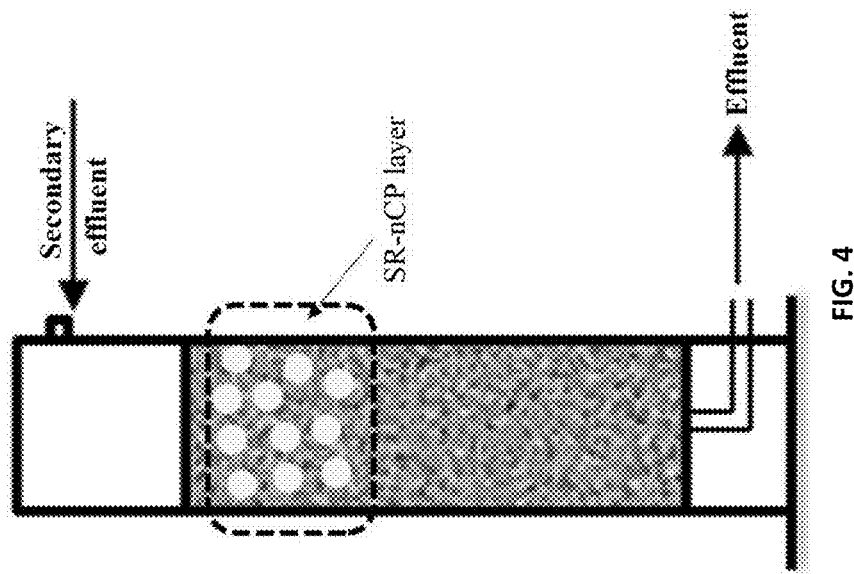
FIG. 4 is an application schematic diagram of SR-nCP materials of the present invention in a bioreactor.
Figure 5:
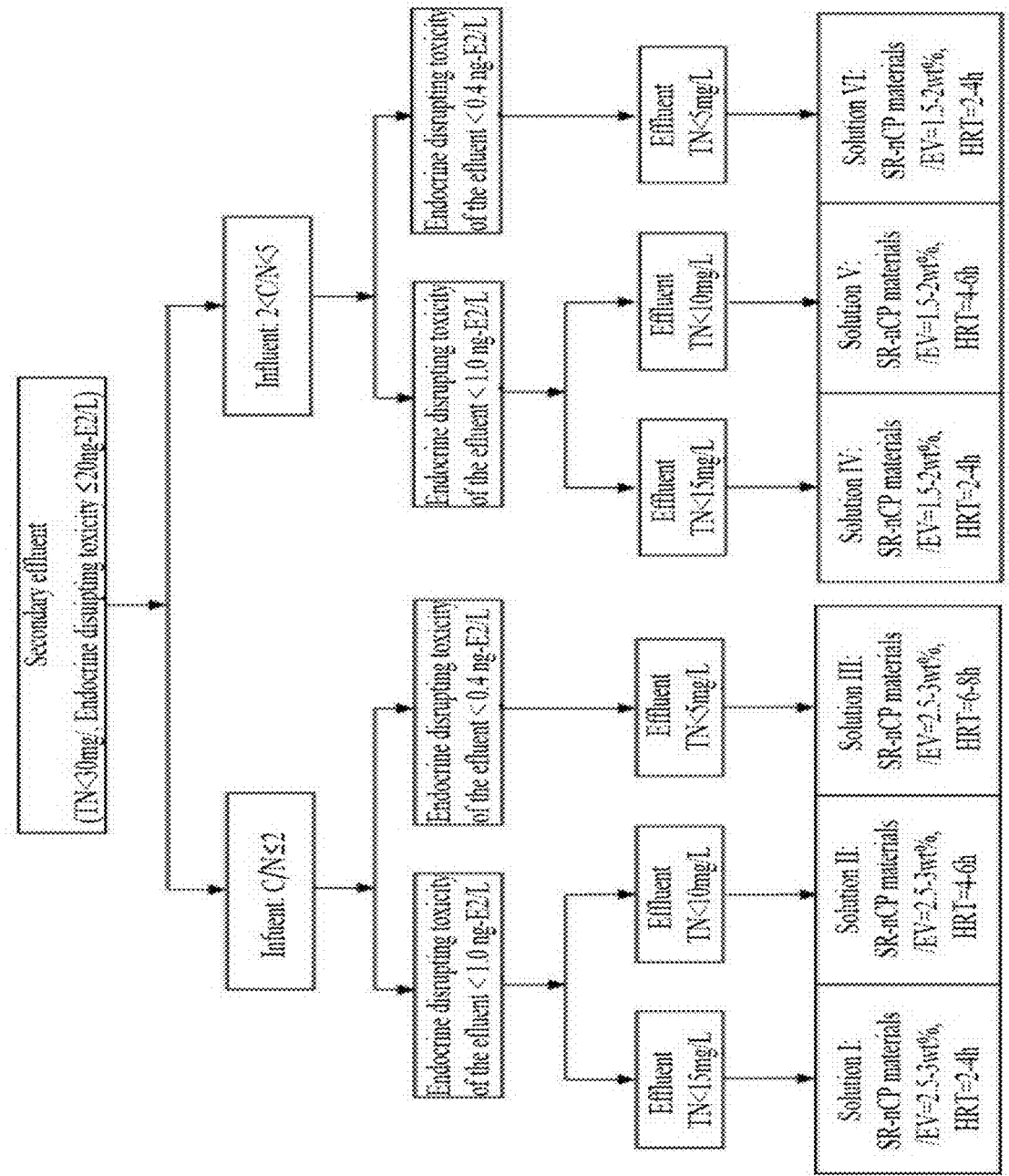
FIG. 5 is a solution diagram of the present invention in different application scenarios; and SR-nCPs are sustained-release calcium peroxide nanoparticles, and EV refers to an effective volume of the bioreactor.

In order to further illustrate the content of the present invention, the present invention will be described in detail below through examples.

The method of the examples of the present invention is used for treating secondary effluent of a municipal wastewater treatment plant, and the water quality of the secondary effluent is as follows: the concentration of COD is 45-60 mg/L, the TN concentration is 20-30 mg/L, the endocrine disrupting toxicity is 10-20 ng-E2/L, the pH is 6.5-8.0, and the temperature is 25-30° C.

Example 1

A method for intensification of advanced biological nitrogen removal and reduction of endocrine disrupting toxicity (estrogen toxicity), including the following steps:

S1: preparing sustained-release calcium peroxide nanoparticles (SR-nCPs)

S1-1: calcium sulfate powder was weighed and added to deionized water and dispersed evenly, then 1 M of a potassium hydroxide solution was added to the deionized water to prepare an alkaline suspension containing the calcium sulfate powder, where a mass ratio of the calcium sulfate to the deionized water is 1:5, and a volume ratio of the potassium hydroxide solution to the deionized water is 1:1;

S1-2: a mechanical stirrer was used to stir the above alkaline suspension violently at room temperature, a hydrogen peroxide solution with a mass fraction of 30% was slowly added to the alkaline suspension, and the suspension was left stand to react for 2 h and generate a precipitate, where a molar ratio of the hydrogen peroxide to the calcium sulfate in the suspension is 1:5;

S1-3: the above precipitate was first washed with deionized water for three times, then washed with absolute ethanol for three times, dried under the condition of 60° C. for 48 h to obtain nano-calcium peroxide (n-CP) oxygen-releasing materials and stored the materials in a sealed and dry environment for subsequent use;

S1-4: polyvinyl alcohol, sodium carboxymethyl cellulose and stearic acid were weighed and adding them to deionized water, heated under the condition of 90° C. for 2 h to obtain a colloidal substance, then the above n-CP oxygen-releasing materials and quartz sand were weighed and added to the colloidal substance, and mixed and stirred evenly to obtain a mixed colloidal substance, where a mass concentration of the polyvinyl alcohol is 4 wt %, a mass concentration of the sodium carboxymethyl cellulose is 1 wt %, and a mass concentration of the stearic acid is 1 wt %; after the n-CP oxygen-releasing materials and quartz sand were added to the colloidal substance, a mass concentration of the n-CP in the colloidal substance is 5 wt %, and a mass ratio of the added quartz sand to the n-CP is 1:1;

S1-5: the above mixed colloidal substance was added to a spherical silicone mold, the cooled mold was put under the condition of −20° C. for freezing crosslinking for 16 h, then thawing and freezing again, the process was repeated for many times, frozen crosslinked spherical particles were impregnated in a prepared $CaCl_2$ saturated boric acid solution with a mass fraction of 3% for chemically crosslinking for 12 h, and dried under the condition of 60° C. for 48 h to obtain SR-nCPs;

S2: the SR-nCPs were added in a targeted manner according to the water quality characteristics of the wastewater, and a SR-nCP layer was constructed in a bioreactor; where the add mass accounts for 2.5 wt % of the effective volume of the reactor, the SR-nCPs added is located at ⅓ of the height of the whole filler layer, and the SR-nCPs were added once every 10 d;

S3: an inoculation biofilm culturing method was adopted to start biofilm culturing, and wastewater was introduced into the bioreactor to perform stable operation, where the inoculation sludge used was taken from sludge in an anoxic tank of a municipal wastewater treatment plant, the MLSS concentration was 3,800 mg/L, the hydraulic retention time of the bioreactor was set to be 6 h, ceramsite was selected as a filler of the bioreactor, and the bioreactor ran in a downflow mode, the operating temperature is 10° C., the total nitrogen (TN) in the influent is not higher than 30 mg/L, and the endocrine disrupting toxicity of the filler layer is not higher than 20 ng-E2/L.

Example 2

A method for intensification of advanced biological nitrogen removal and reduction of endocrine disrupting toxicity, including the following steps:

S1: preparing SR-nCPs

S1-1: calcium sulfate powder was weighed and added to deionized water and dispersed evenly, then 1 M of a potassium hydroxide solution was added to the deionized water to prepare an alkaline suspension containing the calcium sulfate powder, where a mass ratio of the calcium sulfate to the deionized water is 1:10, and a volume ratio of the potassium hydroxide solution to the deionized water is 1:2.5;

S1-2: a mechanical stirrer was used to stir the above alkaline suspension violently at room temperature, a hydrogen peroxide solution with a mass fraction of 30% was slowly added to the alkaline suspension, and the suspension was left stand to react for 2 h and generate a precipitate, where a molar ratio of the hydrogen peroxide to the calcium sulfate in the suspension is 1:8;

S1-3: the above precipitate was first washed with deionized water for three times, then washed with absolute ethanol for three times, dried under the condition of 70° C. for 32 h to obtain n-CP oxygen-releasing materials and stored the materials in a sealed and dry environment for subsequent use;

S1-4: polyvinyl alcohol, sodium carboxymethyl cellulose and stearic acid were weighed and adding them to deionized water, heated under the condition of 95° C. for 2.5 h to obtain a colloidal substance, then the above n-CP oxygen-releasing materials and quartz sand were weighed and added to the colloidal substance, and mixed and stirred evenly to obtain a mixed colloidal substance, where after the polyvinyl alcohol, sodium carboxymethyl cellulose and stearic acid are added to the deionized water, a mass concentration of the polyvinyl alcohol is 6 wt %, a mass concentration of the sodium carboxymethyl cellulose is 2 wt %, and a mass concentration of the stearic acid is 1.5 wt %; after the n-CP oxygen-releasing materials and quartz sand were added to the colloidal substance, a mass concentration of the n-CP in the colloidal substance is 8 wt %, and a mass ratio of the added quartz sand to the n-CP is 1:1.5;

S1-5: the above mixed colloidal substance was added to a spherical silicone mold, the cooled mold was put under the condition of −60° C. for freezing crosslinking for 14 h, then thawing and freezing again, the process was repeated for many times, frozen crosslinked spherical particles were impregnated in a prepared $CaCl_2$ saturated boric acid solution with a mass fraction of 4.5% for chemically crosslinking for 14 h, and dried under the condition of 70° C. for 32 h to obtain SR-nCPs;

S2: the SR-nCPs were added in a targeted manner according to the water quality characteristics of the wastewater, and a SR-nCP layer was constructed in a bioreactor; where the add mass accounts for 2.8 wt % of the effective volume of the reactor, the SR-nCPs added is located at ¼ of the height of the whole filler layer, and the SR-nCPs were added once every 15 d; and S3: an inoculation biofilm culturing method was adopted to start biofilm culturing, and wastewater was introduced into the bioreactor to perform stable operation, where the inoculation sludge used was taken from sludge in an anoxic tank of a municipal wastewater treatment plant, the MLSS concentration was 3,800 mg/L, the hydraulic retention time of the bioreactor was set to be 7 h, ceramsite was selected as a filler of the bioreactor, and the bioreactor ran in a downflow mode, the operating temperature is 25° C., the total nitrogen (TN) in the influent is not higher than 30 mg/L, and the endocrine disrupting toxicity of the filler layer is not higher than 20 ng-E2/L.

Example 3

A method for intensification of advanced biological nitrogen removal and reduction of endocrine disrupting toxicity, including the following steps:

S1: Preparing SR-nCPs

S1-1: calcium sulfate powder was weighed and added to deionized water and dispersed evenly, then 1 M of a potassium hydroxide solution was added to the deionized water to prepare an alkaline suspension containing the calcium sulfate powder, where a mass ratio of the calcium sulfate to the deionized water is 1:15, and a volume ratio of the potassium hydroxide solution to the deionized water is 1:5;

S1-2: a mechanical stirrer was used to stir the above alkaline suspension violently at room temperature, a hydrogen peroxide solution with a mass fraction of 30% was slowly added to the alkaline suspension, and the suspension was left stand to react for 2 h and generate a precipitate, where a molar ratio of the hydrogen peroxide to the calcium sulfate in the suspension is 1:10;

S1-3: the above precipitate was first washed with deionized water for three times, then washed with absolute ethanol for three times, dried under the condition of 60° C. for 24 h to obtain n-CP oxygen-releasing materials and stored the materials in a sealed and dry environment for subsequent use;

S1-4: polyvinyl alcohol, sodium carboxymethyl cellulose and stearic acid were weighed and adding them to deionized water, heated under the condition of 100° C. for 3 h to obtain a colloidal substance, then the above n-CP oxygen-releasing materials and quartz sand were weighed and added to the colloidal substance, and mixed and stirred evenly to obtain a mixed colloidal substance, where after the polyvinyl alcohol, sodium carboxymethyl cellulose and stearic acid are added to the deionized water, a mass concentration of the polyvinyl alcohol is 10 wt %, a mass concentration of the sodium carboxymethyl cellulose is 4 wt %, and a mass concentration of the stearic acid is 2 wt %; after the n-CP oxygen-releasing materials and quartz sand were added to the colloidal substance, a mass concentration of the n-CP in the colloidal substance is 15 wt %, and a mass ratio of the added quartz sand to the n-CP is 1:2;

S1-5: the above mixed colloidal substance was added to a spherical silicone mold, the cooled mold was put under the condition of −80° C. for freezing crosslinking for 12 h, then thawing and freezing again, the process was repeated for many times, frozen crosslinked spherical particles were impregnated in a prepared $CaCl_2$ saturated boric acid solution with a mass fraction of 6% for chemically crosslinking for 16 h, and dried under the condition of 80° C. for 48 h to obtain SR-nCPs;

S2: the SR-nCPs were added in a targeted manner according to the water quality characteristics of the wastewater, and a SR-nCP layer was constructed in a bioreactor; where the add mass accounts for 3 wt % of the effective volume of the reactor, the SR-nCPs added is located at ⅓ of the height of the whole filler layer, and the SR-nCPs were added once every 20 d; and S3: an inoculation biofilm culturing method was adopted to start biofilm culturing, and wastewater was introduced into the bioreactor to perform stable operation, where the inoculation sludge used was taken from sludge in an anoxic tank of a municipal wastewater treatment plant, the MLSS concentration was 3,800 mg/L, the hydraulic retention time of the bioreactor was set to be 8 h, ceramsite was selected as a filler of the bioreactor, and the bioreactor ran in a downflow mode, the operating temperature is 35° C., the total nitrogen (TN) in the influent is not higher than 30 mg/L, and the endocrine disrupting toxicity of the filler layer is not higher than 20 ng-E2/L.

Example 4

The present example is substantially the same as Example 2, except that:

S3: an inoculation biofilm culturing method was adopted to start biofilm culturing, and wastewater was introduced into the bioreactor for operation, where the inoculation sludge used was taken from sludge in an anoxic tank of a municipal wastewater treatment plant, the MLSS concentration was about 3,800 mg/L, the hydraulic retention time of the bioreactor was set to be 5 h, ceramsite was selected as a filler of the bioreactor, and the bioreactor ran in a downflow mode;

in the operation process, compared with a common reactor, an enhanced reactor features that the TN in the effluent is lower than 10 mg/L, the removal rate is increased by 58.28%, the reduction rate of endocrine disrupting toxicity can reach more than 95%, and the endocrine disrupting toxicity of the effluent is lower than 1.0 ng-E2/L.

Example 5

The present example is substantially the same as Example 2, except that:

S3: an inoculation biofilm culturing method was adopted to start biofilm culturing, and wastewater was introduced into the bioreactor for operation, where the inoculation sludge used was taken from sludge in an anoxic tank of a municipal wastewater treatment plant, the MLSS concentration was about 3,800 mg/L, the hydraulic retention time of the bioreactor was set to be 3 h, ceramsite was selected as a filler of the bioreactor, and the bioreactor ran in a downflow mode;

in the operation process, compared with a common reactor, an enhanced reactor features that the TN in the effluent is lower than 15 mg/L (inclusive), the removal rate is increased by 25.77%, the reduction rate of endocrine disrupting toxicity can reach more than 95% and is increased by 20%, and the endocrine disrupting toxicity of the effluent is lower than 1.0 ng-E2/L.

Example 6

The present example is substantially the same as Example 4, except that:

in the S2, the quantity of SR-nCPs added and the operating conditions of the reactor are subjected to the following solutions:

S2-1: when the C/N in the influent is lower than 2 (inclusive), the endocrine disrupting toxicity of the effluent is lower than 1.0 ng-E2/L(inclusive) and the TN in the effluent is lower than 15 mg/L, Solution I is selected, namely, the SR-nCP materials added/bioreactor volume equals to 3 wt %, and the HRT of the reactor is set to be 4 h;

S2-2: when the C/N in the influent is lower than 2 (inclusive), the endocrine disrupting toxicity of the effluent is lower than 1.0 ng-E2/L and the TN in the effluent is lower than 10 mg/L, Solution II is selected, namely, the SR-nCP materials added/bioreactor volume equals to 3 wt %, and the HRT of the reactor is set to be 6 h;

S2-3: when the C/N in the influent is lower than 2 (inclusive), the endocrine disrupting toxicity of the effluent is lower than 0.4 ng-E2/L and the TN in the effluent is lower than 5 mg/L, Solution III is selected, namely, the SR-nCP materials added/bioreactor volume equals to 3 wt %, and the HRT of the reactor is set to be 8 h;

S2-4: when the C/N in the influent is greater than 2 but lower than 5, the endocrine disrupting toxicity of the effluent is lower than 1.0 ng-E2/L and the TN in the effluent is lower than 15 mg/L, Solution IV is selected, namely, the SR-nCP materials added/bioreactor volume equals to 2 wt %, and the HRT of the reactor is set to be 4 h;

S2-5: when the C/N in the influent is greater than 2 but lower than 5, the endocrine disrupting toxicity of the effluent is lower than 1.0 ng-E2/L and the TN in the effluent is lower than 10 mg/L, Solution V is selected, namely, the SR-nCP materials added/bioreactor volume equals to 2 wt %, and the HRT of the reactor is set to be 6 h; and S2-6: when the C/N in the influent is greater than 2 but lower than 5, the endocrine disrupting toxicity of the effluent is lower than 0.4 ng-E2/L and the TN in the effluent is lower than 5 mg/L, Solution VI is selected, namely, the SR-nCP materials added/bioreactor volume equals to 2 wt %, and the HRT of the reactor is set to be 8 h.

Example 7

The present example is substantially the same as Example 6, except that:

After the wastewater is treated in the bioreactor in the S3, the wastewater may be further treated by the electrocoagulation precipitation, with the specific process being as follows: adding effluent from the bioreactor to an electrocoagulation precipitation device, electrifying for 5 min under the condition of a DC electric field with a voltage of 3V, and then boosting the voltage at a boost rate of 1 V/min until the voltage reaches 8 V, so that metabolites of biological treatment are aggregated and precipitated to achieve final discharge or reuse of effluent with better quality.

What is claimed is:

1. A method for biological denitrification enhancement and toxicity reduction, comprising the following steps:
    S1: preparing sustained-release calcium peroxide nanoparticles (SR-nCPs) by carrying the following steps S1-1 to S1-5:
        S1-1: adding calcium sulfate powder to deionized water and dispersing evenly, then adding 1 M of a potassium hydroxide solution to the deionized water to prepare an alkaline suspension containing the calcium sulfate powder, wherein a mass ratio of the calcium sulfate to the deionized water is 1:5-15, and a volume ratio of the potassium hydroxide solution to the deionized water is 1:1-5;
        S1-2: using a mechanical stirrer to stir the above alkaline suspension at room temperature, adding a hydrogen peroxide solution with a mass fraction of 30% to the alkaline suspension, letting the suspension stand to react for 2 h and generate a precipitate, wherein a molar ratio of the hydrogen peroxide to the calcium sulfate in the suspension is 1:5-10;
        S1-3: first washing the above precipitate with deionized water for three times, then washing with absolute ethanol for three times, drying under the condition of 60-80° C. for 24-48 h to obtain nano-calcium peroxide (n-CP) oxygen-releasing materials and storing the materials in a sealed and dry environment for subsequent use;
        S1-4: adding polyvinyl alcohol, sodium carboxymethyl cellulose and stearic acid to deionized water, heating under the condition of 90-100° C. for 2-3 h to obtain a colloidal substance, then adding the n-CP oxygen-releasing materials and quartz sand to the colloidal substance, and mixing and stirring them evenly to obtain a mixed colloidal substance;
        S1-5: adding the mixed colloidal substance to a spherical silicone mold, putting the spherical mold under the condition of −80-−20° C. for freezing crosslinking for 12-16 h, then thawing and freezing again, repeating process of thawing and freezing for multiple times, and obtaining frozen crosslinked spherical particles; adding the frozen crosslinked spherical particles into a saturated boric acid solution containing 3-6% of $CaCl_2$ by weight for chemically crosslinking for 12-16 h, and drying under the condition of 60-80° C. for 24-48 h to obtain SR-nCPs;
    S2: constructing various SR-nCP layers in bioreactors for wastewaters with various properties by adding a certain amount of the SR-nCPs in one of the bioreactors corresponding to wastewater with a certain property; and
    S3: adding a biofilm into a bioreactor with a SR-nCP layer and culturing the biofilm by adopting an inoculation biofilm culturing method or a natural biofilm culturing method, and introducing the wastewater into the bioreactor for reaction to form an effluent;
    wherein the bioreactor is an anoxic bioreactor or an anaerobic bioreactor.

2. The method for according to claim 1, wherein in the S1-4, after the polyvinyl alcohol, sodium carboxymethyl cellulose and stearic acid are added to the deionized water, a mass concentration of the polyvinyl alcohol is 4-10 wt %, a mass concentration of the sodium carboxymethyl cellulose is 1-4 wt %, and a mass concentration of the stearic acid is 1-2 wt %; after the n-CP oxygen-releasing materials and quartz sand are added to the colloidal substance, a mass concentration of the n-CP in the colloidal substance is 5-15 wt %, and a mass ratio of the added quartz sand to the n-CP is 1:1-2.

3. The method for according to claim 1, wherein in the S2, the bioreactor runs in a downflow mode, the operating temperature is 10-35° C., total nitrogen (TN) in wastewater is less than 30 mg/L, and endocrine disrupting toxicity of a filler layer is less than 20 ng of endocrine/L.

4. The method for according to claim 1, wherein in the S2, the amount of SR-nCPs is added into the each of the bioreactors as the following:
- S2-1: when the carbon/nitrogen C/N in wastewater is lower than 2 (inclusive), the endocrine disrupting toxicity of effluent is lower than 1.0 ng of endocrine/L and total nitrogen (TN) in the effluent is lower than 15 mg/L, the added amount of SR-nCP materials into the bioreactor equals to 2.5-3 by kg/liter, and the reaction is set for 2-4 h;
- S2-1: when the C/N in wastewater is lower than 2 (inclusive), the endocrine disrupting toxicity of the effluent is lower than 1.0 ng of endocrine/L and the TN in the effluent is lower than 10 mg/L, the added amount of SR-nCP materials into the bioreactor volume equals to 2.5-3% by kg/liter, and the reaction is set for 4-6 h;
- S2-3: when the C/N in wastewater is lower than 2 (inclusive), the endocrine disrupting toxicity of the effluent is lower than 0.4 ng of endocrine/L and the TN in the effluent is lower than 5 mg/L, the added mount of SR-nCP materials into the bioreactor equals to 2.5-3 by kg/liter, and the reaction is set for 6-8 h;
- S2-4: when the C/N in wastewater is higher than 2 but lower than 5, the endocrine disrupting toxicity of the effluent is lower than 1.0 ng of endocrine/L and the TN in the effluent is lower than 15 mg/L, the added amount of SR-nCP materials into the bioreactor equals to 1.5-2 by kg/liter, and the reaction is set for 2-4 h;
- S2-5: when the C/N in wastewater is higher than 2 but lower than 5, the endocrine disrupting toxicity of the effluent is lower than 1.0 ng of endocrine/L and the TN in the effluent is lower than 10 mg/L, the added amount of SR-nCP materials into the bioreactor equals to 1.5-2% by kg/liter, and the reaction is set for 4-6 h; and
- S2-6: when the C/N in wastewater is higher than 2 but lower than 5, the endocrine disrupting toxicity of the effluent is lower than 0.4 ng of endocrine/L and the TN in the effluent is lower than 5 mg/L, the added amount of SR-nCP materials into the bioreactor equals to 1.5-2% by kg/liter, and the reaction is set for 6-8 h.

5. The method for according to claim 1, wherein in the S2, positions where the SR-nCPs are added in the bioreactor are at the positions of $1/5$-$1/3$ of the height of a whole filler layer.

6. The method for according to claim 1, wherein in the S2, adding additional SR-nCPs into the bioreactor in every 10-20 days.

7. The method for according to claim 1, wherein a filler layer of the bioreactor comprise one or some of ceramsite, quartz sand and volcanic rock.

8. The method for according to claim 1, wherein after the wastewater is treated in the bioreactor in the S3, the wastewater is optionally further treated by electrocoagulation precipitation, with the specific process being as follows: adding effluent from the bioreactor to an electrocoagulation precipitation device, electrifying for 5 min under the condition of a DC electric field with a voltage of 3 V, and then boosting the voltage at a boost rate of 1 V/min until the voltage reaches 6-8V, so that metabolites of biological treatment are aggregated and precipitated to achieve final discharge or reuse of the effluent.

\* \* \* \* \*